United States Patent
Chawla et al.

(10) Patent No.: US 9,009,219 B2
(45) Date of Patent: Apr. 14, 2015

(54) NATIVE VIEWER USE FOR SERVICE RESULTS FROM A REMOTE DESKTOP

(75) Inventors: Puneet Singh Chawla, Fremont, CA (US); Daniel Beveridge, Apollo Beach, FL (US); Scott Howard Davis, Needham, MA (US)

(73) Assignee: VMware, Inc., Palo Alto, CA (US)

( * ) Notice: Subject to any disclaimer, the term of this patent is extended or adjusted under 35 U.S.C. 154(b) by 95 days.

(21) Appl. No.: 13/217,484

(22) Filed: Aug. 25, 2011

(65) Prior Publication Data

US 2013/0018939 A1  Jan. 17, 2013

Related U.S. Application Data

(60) Provisional application No. 61/508,404, filed on Jul. 15, 2011.

(51) Int. Cl.
  *G06F 15/16* (2006.01)
  *H04L 29/08* (2006.01)
  *G06F 3/00* (2006.01)

(52) U.S. Cl.
  CPC ........... *H04L 67/08* (2013.01); *H04L 67/36* (2013.01)

(58) Field of Classification Search
  None
  See application file for complete search history.

(56) References Cited

U.S. PATENT DOCUMENTS

| | | | |
|---|---|---|---|
| 7,117,243 B2 * | 10/2006 | Peart | 709/203 |
| 7,184,764 B2 | 2/2007 | Raviv et al. | |
| 7,606,868 B1 * | 10/2009 | Le et al. | 709/211 |
| 7,669,020 B1 | 2/2010 | Shah et al. | |
| 8,112,748 B2 | 2/2012 | Pomerantz | |
| 8,261,268 B1 | 9/2012 | Forgette | |
| 8,271,528 B1 | 9/2012 | Wilkinson et al. | |
| 8,433,802 B2 | 4/2013 | Head et al. | |
| 2003/0195950 A1 | 10/2003 | Huang et al. | |
| 2006/0080397 A1 | 4/2006 | Chene et al. | |
| 2007/0174410 A1 * | 7/2007 | Croft et al. | 709/208 |
| 2007/0180493 A1 | 8/2007 | Croft et al. | |
| 2007/0186212 A1 | 8/2007 | Mazzaferri et al. | |
| 2007/0192329 A1 | 8/2007 | Croft et al. | |
| 2007/0198656 A1 | 8/2007 | Mazzaferri et al. | |
| 2007/0204011 A1 | 8/2007 | Shaver et al. | |
| 2007/0260702 A1 | 11/2007 | Richardson et al. | |
| 2008/0034071 A1 | 2/2008 | Wilkinson et al. | |
| 2008/0250424 A1 | 10/2008 | Brugiolo et al. | |
| 2008/0281798 A1 | 11/2008 | Chatterjee et al. | |
| 2008/0320583 A1 | 12/2008 | Sharma et al. | |
| 2009/0006537 A1 | 1/2009 | Palekar et al. | |

(Continued)

OTHER PUBLICATIONS

Tedd Foxx, Citrix Receiver >> XenApp—Citrix Community, http://community.citrix.com/display/xa/Citrix+Receiver, Aug. 13, 2010.

(Continued)

*Primary Examiner* — Wen-Tai Lin (57) ABSTRACT

In one embodiment, a method includes establishing a session to a remote desktop determined for a user of a client device. The session allows the client device to remotely access the remote desktop to have one or more services performed for the user of the client device using resources of the remote desktop. The client device sends a request for a service in the one or more services to be performed on the remote desktop in the session and receives a result set determined from the service being performed by the remote desktop. A native viewer for the client device is determined based on a type of the result set. The native viewer is then invoked to display the result set.

18 Claims, 7 Drawing Sheets

(56) References Cited

U.S. PATENT DOCUMENTS

| | | | |
|---|---|---|---|
| 2009/0094523 A1* | 4/2009 | Treder et al. | 715/738 |
| 2009/0216975 A1 | 8/2009 | Halperin et al. | |
| 2009/0235358 A1 | 9/2009 | Tolba | |
| 2009/0240904 A1 | 9/2009 | Austruy et al. | |
| 2010/0070870 A1 | 3/2010 | Halperin et al. | |
| 2010/0070978 A1 | 3/2010 | Chawla et al. | |
| 2010/0114867 A1 | 5/2010 | Olston | |
| 2010/0131654 A1 | 5/2010 | Malakapalli et al. | |
| 2010/0131949 A1 | 5/2010 | Ferris | |
| 2010/0199276 A1 | 8/2010 | Umbehocker | |
| 2010/0211944 A1 | 8/2010 | Kaneda | |
| 2010/0268813 A1 | 10/2010 | Pahlavan et al. | |
| 2010/0269152 A1* | 10/2010 | Pahlavan et al. | 726/3 |
| 2010/0274784 A1 | 10/2010 | Acharya | |
| 2011/0004680 A1 | 1/2011 | Ryman | |
| 2011/0066668 A1 | 3/2011 | Guarraci | |
| 2011/0099297 A1 | 4/2011 | Hayton | |
| 2011/0119668 A1 | 5/2011 | Calder et al. | |
| 2011/0153716 A1 | 6/2011 | Malakapalli et al. | |
| 2011/0184993 A1 | 7/2011 | Chawla et al. | |
| 2011/0185292 A1 | 7/2011 | Chawla et al. | |
| 2011/0185355 A1 | 7/2011 | Chawla et al. | |
| 2011/0209064 A1 | 8/2011 | Jorgensen et al. | |

OTHER PUBLICATIONS

John McBride et al., Project GoldenGate >> XenApp—Citrix Community, http://community.citrix.com/display/xa/Project+GoldenGate, Jul. 1, 2011.

European Patent Office; International Search Report and Written Opinion for PCT/US2010/046377; Transmitted on Jan. 30, 2013; 11 pages.

Quickoffice, Inc.; QuickOffice Pro for iPhone and iPod Touch, Version 4.0.0, User Help Guide; Jan. 1, 2010; 42 pages.

U.S. Appl. No. 12/694,383, filed Jan. 27, 2010.

U.S. Appl. No. 13/217,484, filed Aug. 25, 2011.

* cited by examiner

NATIVE VIEWER USE FOR SERVICE RESULTS FROM A REMOTE DESKTOP

CROSS-REFERENCE TO RELATED APPLICATIONS

This application claims priority to U.S. Provisional App. No. 61/508,404 for "Native Viewer Use for Service Results from a Remote Desktop" filed Jul. 15, 2011, the contents of which is incorporated herein by reference in their entirety.

This application is related by subject matter to U.S. patent application Ser. No. 12/694,358, filed Jan. 27, 2010 and entitled, "Independent Access to Virtual Machine Desktop Content;" U.S. patent application Ser. No. 12/694,368, filed Jan. 27, 2010 and entitled, "Accessing Virtual Disk Content of a Virtual Machine Using a Control Virtual Machine;" and U.S. patent application Ser. No. 12/694,383, filed Jan. 27, 2010 and entitled, "Accessing Virtual Disk Content of a Virtual Machine Without Running A Virtual Desktop;" all of which are incorporated herein by reference in their entireties.

BACKGROUND

Server-based computing allows a networked client device, remotely situated with respect to a server computing system, to access computing resources on the server. For example, the client device may run desktop remoting client software (and/or hardware) that uses a remote desktop protocol, such as Remote Desktop Protocol (RDP), Virtual Network Computing (VNC), or Personal Computer over Internet Protocol (PCoIP), to access a desktop remotely. The desktop remoting application displays an image of a graphical user interface generated by the operating system and applications running at the server computing system, e.g., in a virtual machine.

The term, "desktop" can refer to the virtual machine or physical system accessed by an end user as local (to the user) desktop or workstation computer. Alternatively, the term "desktop" may refer to the human interface environment through which users can launch, interact with, and manage applications, settings, and/or data. The remote desktop is accessible by the user using the remote desktop protocol and a desktop remoting client. The client device transmits user input such as keyboard or mouse input to the remote system to be processed there, and receives display and other data, such as sound, for presentation to the user.

Virtual Desktop Infrastructure (VDI) is used to create a large number of independent computing environments for a large number of users using computer virtualization technologies. Users remotely access the virtual means running in the datacenter using software that remotes the user interface of the remote desktop. Users can login to the virtual desktop anytime from any device supporting a remote protocol to connect to the virtual desktop. A user may be accessing the remote desktop via client devices, such as smart phones, tablet devices, and cellular phones, which have a different form factor than desktop typical computer or laptop. As a result, the image of a graphical user interface may not be ideal for the end user to read due to the form factor of the client device.

For example, the client device may have a smaller screen resolution making the image hard to view or navigate, and precise pointing may be difficult or impossible. For example, touch sensitive screens may be leveraged by client devices to simplify how users interact with applications, and remote desktop solutions that convert the touch events into mouse/keyboard events for the remote desktop may not provide a satisfactory user experience. Thus, displaying the image of the remote desktop may not be very convenient for accessing files on remote desktops from such devices.

Cloud based file synchronization services allow users to install client software on different devices to sync data in a cloud file system. The service is implemented by moving the files into a cloud file system and allowing access to the files from different client devices/platforms. The file changes are synchronized into the "central" copy. This solution has limitations in that the remoting is not a desktop solution and can be inconvenient to administer. Also, enterprise customers may not want their employees to use $3^{rd}$ party public cloud deployments for security reasons. The enterprises may want to permit employees to access personal files from various devices, but want any persistent copy to remain only in the enterprise's private datacenter(s). Also, the cloud based file synchronization service is inefficient, requiring extra storage to store the files in the cloud, resulting in additional costs.

SUMMARY

In one embodiment, a method includes establishing a session to a remote desktop determined for a user of a client device. The session allows the client device to remotely access the remote desktop to have one or more services performed for the user of the client device using resources of the remote desktop. The client device sends a request for a service in the one or more services to be performed on the remote desktop in the session and receives a result set determined from the service being performed by the remote desktop. A native viewer for the client device is determined based on a type of the result set. The native viewer is then invoked to display the result set.

In another embodiment, a method includes establishing, at a remote desktop for a user, a session to a client device for the user, the session allowing the client device to remotely access the remote desktop to have one or more services performed for the user of the client device using resources of the remote desktop; receiving, at a service agent of the remote desktop, a request from the client device for a service in the one or more services to be performed in the session; causing the service to be performed by the remote desktop; determining a result set from the service being performed; and sending the result set to the client device, wherein the client device uses a native viewer to display the result set.

In another embodiment, a non-transitory computer-readable storage medium is provided and contains instructions for controlling a computer system to be operable to: establish a session to a remote desktop determined for a user of a client device, the session allowing the client device to remotely access the remote desktop to have one or more services performed for the user of the client device using resources of the remote desktop; send, from the client device, a request for a service in the one or more services to be performed on the remote desktop in the session; receive a result set determined from the service being performed by the remote desktop; determine a native viewer for the client device based on a type of the result set; and invoke the native viewer to display the result set.

The following detailed description and accompanying drawings provide a more detailed understanding of the nature and advantages of the present invention.

DETAILED DESCRIPTION

In the following description, for purposes of explanation, numerous examples and specific details are set forth in order to provide a thorough understanding of embodiments of the present invention. Particular embodiments as defined by the claims may include some or all of the features in these examples alone or in combination with other features described below, and may further include modifications and equivalents of the features and concepts described herein.

Figure 1:
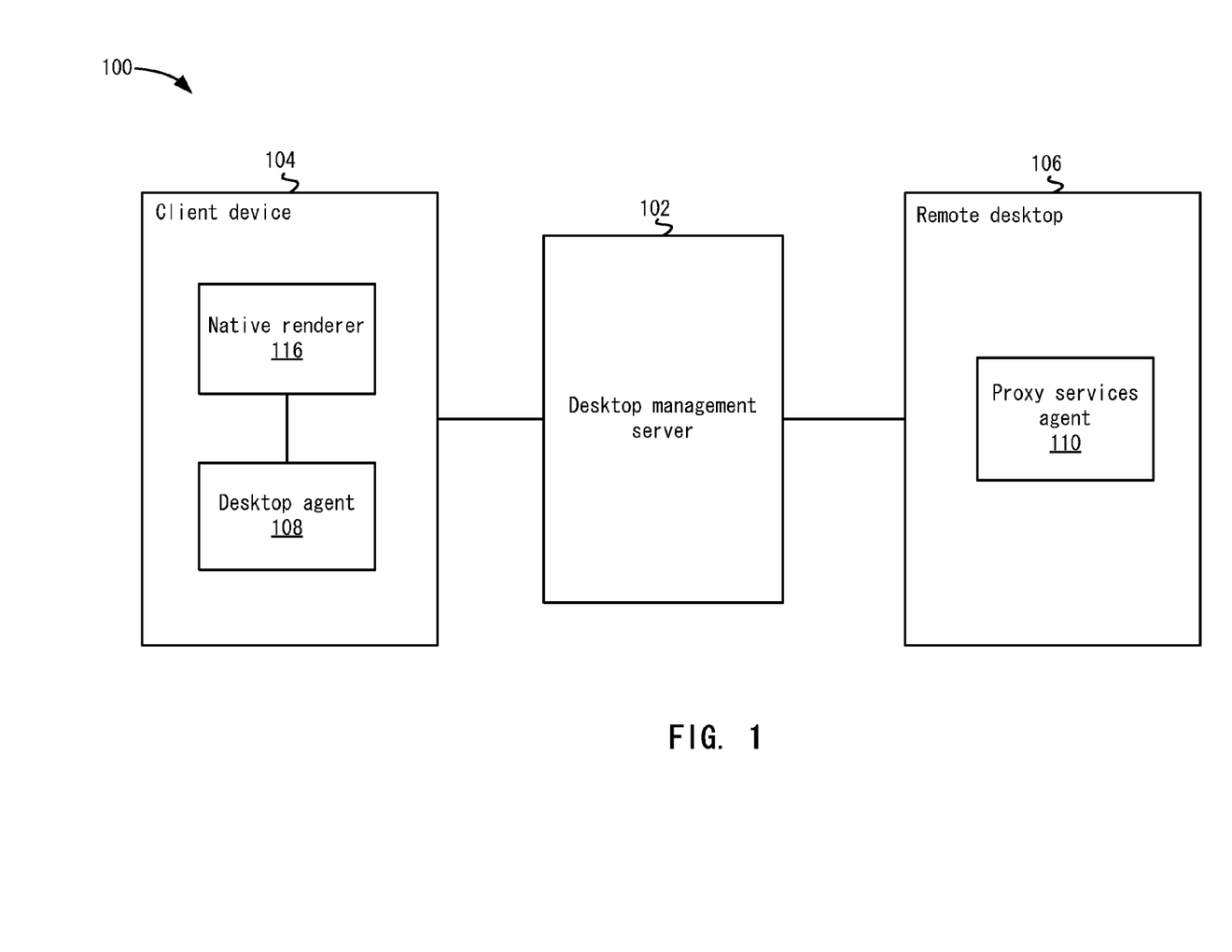
FIG. 1 depicts a system for providing desktop services according to one embodiment.

FIG. 1 depicts a system 100 for providing desktop services according to one embodiment. Users may use a client device 104 to interact with a desktop management server 102 to access services provided by a user's remote desktop 106. Client device 104 may use a client services interface to have services performed by remote desktop 106. The client services interface may be part of a remote desktop solution allowing access to remote desktop 106.

Client device 104 may send service requests to remote desktop 106. As will be described below, proxy services agent 110 may provide multiple services. Proxy services agent 110 processes the request by having the service performed by remote desktop 106. A result set is generated by remote desktop 106 and proxy services agent 110 sends the result set to client device 104. A native viewer (not shown) on client device 104 may be invoked and used to display the result set. Thus, instead of using a remote desktop protocol to display an image of the user's remote desktop 106, the native viewer is used to display the result set. With client devices 104 having a different form factor than a user's desktop, the user may leverage certain features, such as touch-screen navigation and smooth scrolling provided by the native application that are available on client device 104, but may not be available by remoting desktop 106.

Remote desktop 106 may be a physical computer system or a virtualized computer system. Physical desktops may be actual physical machines being controlled remotely. Virtualized desktops may export user interfaces, e.g., keyboard and mouse input, audio and visual output, to the user from virtual machines running remotely (in the datacenter) or locally on client device 104, or, in some cases, using a hybrid.

Desktop management server 102 may be an interface layer that includes desktop management software with various functions. Desktop management server 102 (see FIG. 7) includes a connection broker 723, which allows a remote user to select a type of remote desktop (e.g., remote desktop client or client services interface) and initiate a desktop session, or a connection to remote desktop 106 using client device 104.

Client device 104 may be a mobile device, such as a cellular phone, smart phone, tablet, personal computer (PC), laptop or other computing device that may have a different form factor than a remote desktop. For example, remote desktop 106 may virtualize a screen size that is different from the size of the display provided by access device 104. Additionally, client device 104 may be running a different operating system (OS) with different application characteristics and application programming interfaces (APIs) than remote desktop 106. Client device 104 includes a desktop agent 108 that communicates with desktop management server 102 or directly to remote desktop 106, which may be hosted remotely or locally by a Type 2 hypervisor running on client device 104. Desktop agent 108 may send service requests to have services performed by the user's remote desktop 106. In one embodiment, a side channel for a remote desktop session may be used to send the requests and receive the result sets. This side channel may be used instead of a channel used to send an image of remote desktop 106 using a display protocol. Desktop management server 102 allows non-display traffic to be sent from desktop agent 108 to remote desktop 106 in the side channel. This process will be described in more detail below.

The service queries include file explorer services, web proxy services, and search services, all of which will be described in more detail below. Other services may also be performed. In one embodiment, proxy services agent 110 may only process service requests from client device 104. Other requests, such as remote desktop protocol requests, for the desktop may be processed by other agents in desktop management server 102.

Proxy services agent 110 outputs a result set. The result set may be representative of what would be output on an image of remote desktop 106. For example, the result set may include a list of files that can be displayed by client device 104. Any suitable protocol or API can be implemented for message transmission between client device 104 and desktop management server 102. For example, various web services protocols can be used, and the message payloads may be encrypted and/or compressed. Desktop agent 108 uses a native renderer 116 to display the result set. Desktop agent 108 and native render 116 may be integrated into a single application (or "app") that is installed onto the device. Native renderer 116 selects a native viewer and launches the native viewer to display the result set. The native viewer may be a component of the system software shipped with device 104, an add-on application or plug-in, or integrated with desktop agent 108 and/or native renderer 116. Depending on the type of information in the result set, different native viewers may be used. In one example, native viewers are used to display documents of different file formats, such as PDF, PPT, XLS, and DOCx. The native viewer may be optimized for the screen size of client device 104, and includes features available to client device 104 that may not be available on remote desktop 106. For example, different views, options, and navigation ability (e.g., zoom-in, pan, and rotate features, touch screen, etc.) may be provided for locally viewed result sets. For example, a native file explorer application may be used to display a list of files.

Figure 2:
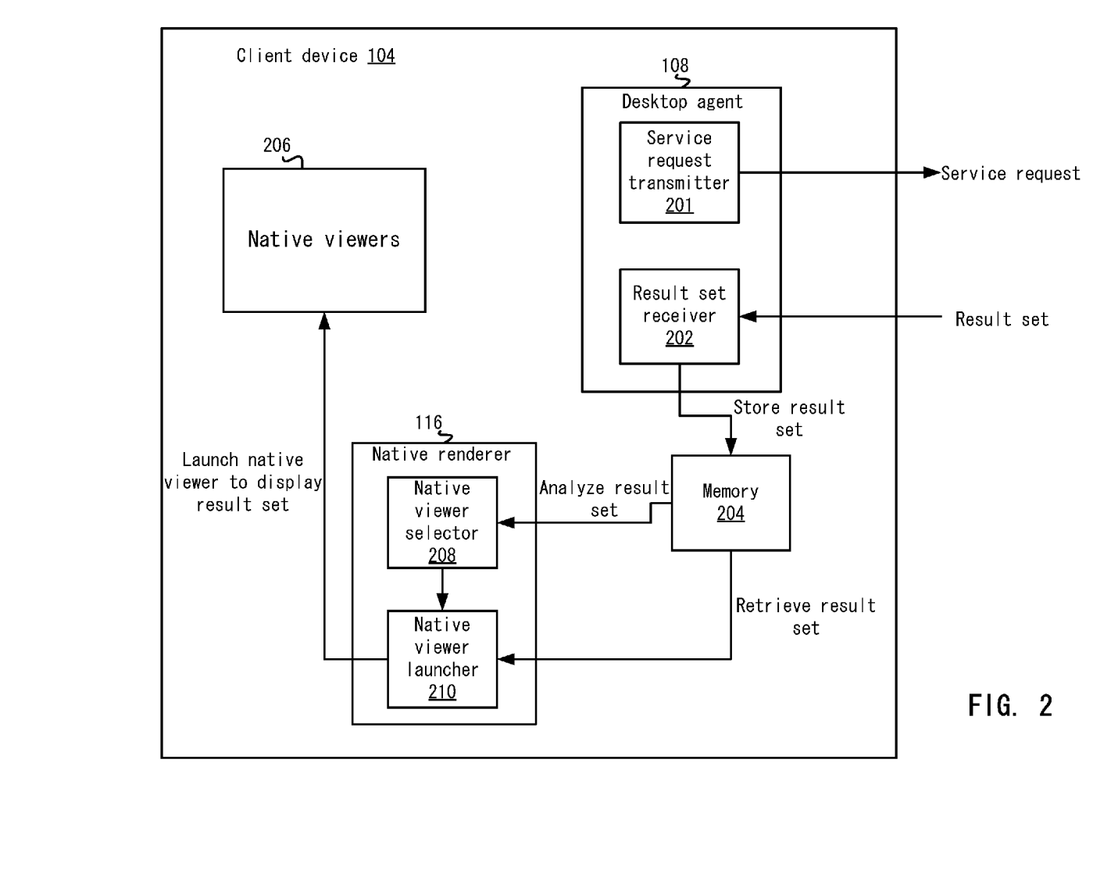
FIG. 2 depicts a more detailed example of a client device according to one embodiment.

FIG. 2 depicts a more detailed example of client device 104 according to one embodiment. The user is authenticated before access to remote desktop 106 is allowed. Once authenticated, a service request transmitter 201 is used to send a service request to remote desktop 106. A result set receiver 202 of desktop agent 108 receives a result set from proxy services agent 110. The authentication process and processing of a service request at remote desktop 106 will be described in more detail below.

In one embodiment, a communication channel may be opened for displaying a remote bitmap representation of remote desktop 106. Various remote desktop protocols, such as RDP, VNC, or PCoIP, may be used to access remote desktop 106. Client device 104 receives over the communication channel display information using the display protocol, and displays a bitmap representation of the remote desktop. A side channel for the communication channel may be used to send service queries and receive result sets that operates inside the same network ports as the main display protocol communication but which logically segments 'side channel' data using a system of embedded content tagging. Desktop agent 108 may open ports on client device 104 that are used to connect to desktop management server 102 through the side channel. Accordingly, client device 104 is not required to communicate through the side channel for receiving the bitmap representation of remote desktop 106. Rather, an independent channel for sending service requests and receiving result sets may be used.

Depending on implementation, service request transmitter 201 and result set receiver 202 may be able to send and receive, respectively, communications in any suitable protocol either as an independent network channel or as a side channel to an established display protocol network channel. The protocols may be able to send metadata and result sets in text-based or binary formats. Additionally, the protocol may be used across different platforms, such as iOS™, Android™, WebOS™, and Blackberry. In one embodiment, JavaScript object notation (JSON) is used. JSON is a text-based format used for sending data over a network connection for web services. Other protocols may also be used. For example, Apache "Thrift" is an interface definition language that is used as a remote procedure call (RPC) framework. Apache Thrift is a binary communication protocol and provides object-level RPC abstractions using a binary wire protocol. "Google protobuf" may also be used for encoding of structured data in a binary format. In one embodiment, when files are selected by a user on client device 104 for retrieval, the above protocols may be used when the native application restricts a client view to a limited number of files per view and paging may be used where portions of files (e.g., pages) are downloaded at a time. Some of the protocols also allow compression of the files and also paging. For commonly used advanced formats like DOCx, PPTx and PDF where the file packaging format is open, the file can be downloaded in pages. In this case, the client services interface also needs to interface with the native viewer application in order to send pages on demand, e.g., when a user advances or scrolls beyond currently cached information.

The result set, upon being downloaded, may be stored in a memory 204, which may be local cache memory. Memory 204 (or the result set stored therein) may be encrypted and made accessible only after the user has been authenticated. Also, memory 204 may be protected from other applications on client device 104 when the user is not accessing remote desktop 106. For example, the data stored in memory 204 is not accessible by other applications other than via desktop agent 108. Known techniques for securing (e.g., encrypting) memory 204 may be used. Also, result sets stored in memory 204 may be persistent. For example, when client device 104 is offline, the result sets in memory may still be accessed. In one embodiment, memory 204 may be a fixed size. When memory 204 is of a fixed size, an eviction policy may be used to clear space in memory 204. Different methods to free up space in memory 204 are known in the art, such as a least recently used (LRU) policy. Also, although memory 204 is described as being a fixed size, memory 204 may be expandable via external memory devices.

In one example, when a service request is performed, memory 204 may be checked to determine if the result set already resides in memory 204. For example, when a file is requested, a "last modified date" time-stamp policy is used to determine if a file has been changed on remote desktop 106 before downloading the file again. If the file has not been changed, then the file may be retrieved from memory 204 and displayed.

After the result set is downloaded to memory 204, a native viewer 206 may be used to render the result set. Native viewers 206 are local to client device 104. That is, the applications, components, plugins, etc., comprising native viewers 206 are stored on client device 104 and are launched on client device 104. Typically, native viewers 206 are customized for the form factor of client device 104. In this case, native viewer 206 may have different features that leverage the form factor. For example, native viewers 206 may leverage touch screens and various touch commands. Also, native viewer 206 may have features that are not available on applications running on remote desktop 106. Additionally, the data may be displayed in a way that fits the form factor in client device 104. For example, mobile devices may have smaller screens and the data may be formatted in a way to optimize the viewing of the data.

A native viewer selector 208 is used to select the type of native viewer 206. Determining which native viewer 206 to use may be based on the type of data included in the result set. For example, metadata for the result set is used to determine which native viewer 106 to use. In one example, Multipurpose Internet Mail Extensions (MIME) types are used to determine the type of data and which native viewer 106 to use. For example, if a PDF file is being displayed, a local PDF "Intent" is launched. The "Intent" is a handler that can launch a local application for client device 104. In other examples, if a text document is being rendered, then a local word processing application is used to render the document. Most client devices 104 include built-in support for common file types, e.g., various Microsoft Office™ files, PDF files, JPG files, etc.

A native viewer launcher 210 launches the selected native viewer 206 to display the result set. In one embodiment, the display the user sees would be the same as if native viewer 206 was launched to display the result set without connecting to remote desktop 106. In other embodiments, a combination of a bitmap display and native viewer 206 may be used. For example, a first frame may include a bitmap representation of remote desktop 106 and a second frame may include a view of the result set (or a portion of the result set) in native viewer 206.

In some embodiments, a local native viewer 206 may not be available to render the result set. In this case, a third-party application may be used. The third-party application may include a cloud-based application where the application is installed and maintained on a server (e.g., a server in a data center that also includes remote desktop 106) that is accessible to client 104. In one example, native viewer launcher 210 opens an interface for the third-party application using a representational state transfer (REST) interface. Native viewer launcher 210 may connect to the server, such as an application publication server (e.g., such as a terminal server or similar technology), to download the result set and be provided with the user interface for edit/view functionality over a desktop remoting protocol. In this case, remote desktop 106 may send the result set to the server instead of client device 104. Also, using the third party application may be efficient when the file size is large and the user is only interested in a portion of the file. In one embodiment, when the server and virtual machine running remote desktop 106 are in the same data center, sending the result set to the server may be faster due to the bandwidth being higher in the data center than sending the result set to client device 104.

Figure 3:
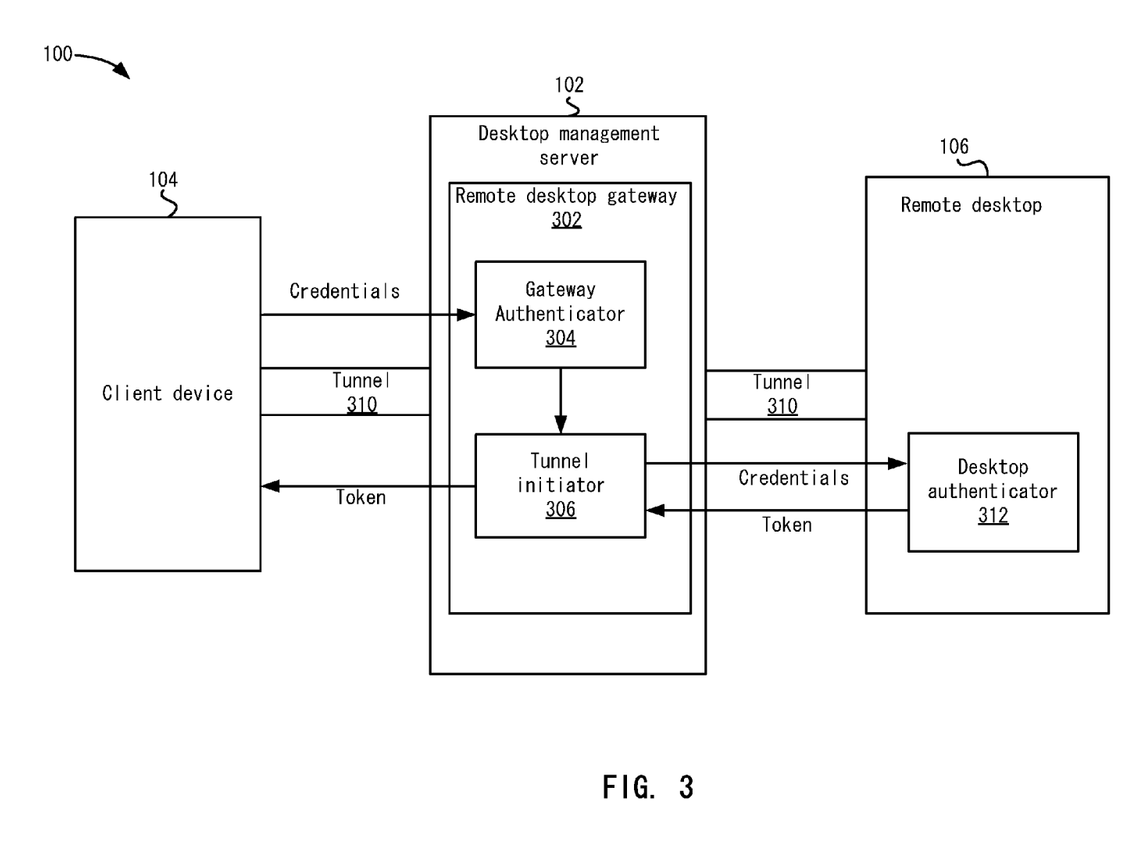
FIG. 3 shows a more detailed example of the system for authenticating the user according to one embodiment.

The user may be authenticated before accessing remote desktop 106. FIG. 3 shows a more detailed example of system 100 for authenticating the user according to one embodiment. A remote desktop gateway 302 is used to authenticate the user. Remote desktop gateway 302 may be deployed in a demilitarized zone (DMZ) in the data center and may be included in a connection broker 723 in FIG. 7, which is described below. In one example, a new client services interface (shown in FIG. 6) is launched by a user to have services performed. The client services interface may be similar to a remote desktop client in terms of establishing connectivity to remote desktop 106. Although the authentication is described with respect to establishing a remote desktop session, an independent authentication process may be used for establishing a session for having services performed. When the client services interface on client device 104 is launched, client device 104 provides credentials to remote desktop gateway 302. For example, enterprise credentials are provided to authenticate the access for the user to remote desktop 106. A gateway authenticator 304 authenticates the credentials. Gateway authenticator 304 may use different methods of authenticating the credentials. In one example, based on the administrative policy, the user may be asked to use a two-factor authentication. For example, the user may be required to first provide an RSA SecurID® or another token and then provides active directory credentials. This authentication process is known and need not be described further.

In one embodiment, in some cases where users are outside an enterprise network, once the user is authenticated, a tunnel initiator 306 determines a remote desktop 106 for the user. For example, a connection is initiated to a virtual machine running in the data center. The credentials are passed to the virtual machine. The virtual machine accessed could be the user's assigned virtual machine, or a generic virtual machine used just for mounting and accessing the user's virtual disk. This way, the user's virtual machine need not be running to access the user's data. A desktop authenticator 312 is used to authenticate the user and returns a token that can be used by client device 104 for communication with remote desktop 106. Tunnel initiator 306 then initiates a tunnel 310 between client device 104, gateway 302, and remote desktop 106. Tunnel 310 allows users from outside a firewall of the enterprise to access resources hosted in the enterprise (e.g., remote desktop 106). It may not be necessary to establish a tunnel for users inside the enterprise network.

In one embodiment, a remote desktop session is also initiated to allow an image of the user's desktop to be displayed. Display protocol information, such as PCoIP/RDP protocol display information, may be sent through tunnel 310. For example, Hypertext Transfer Protocol Secure (HTTPS) is used and the display information is encrypted using secure socket layer (SSL). Additionally, as discussed above, a side channel to the remote desktop session is used to send service requests and result sets through the tunnel. In one embodiment, client device 104 uses separate ports to have services performed than those used to send the display information.

Figure 4:
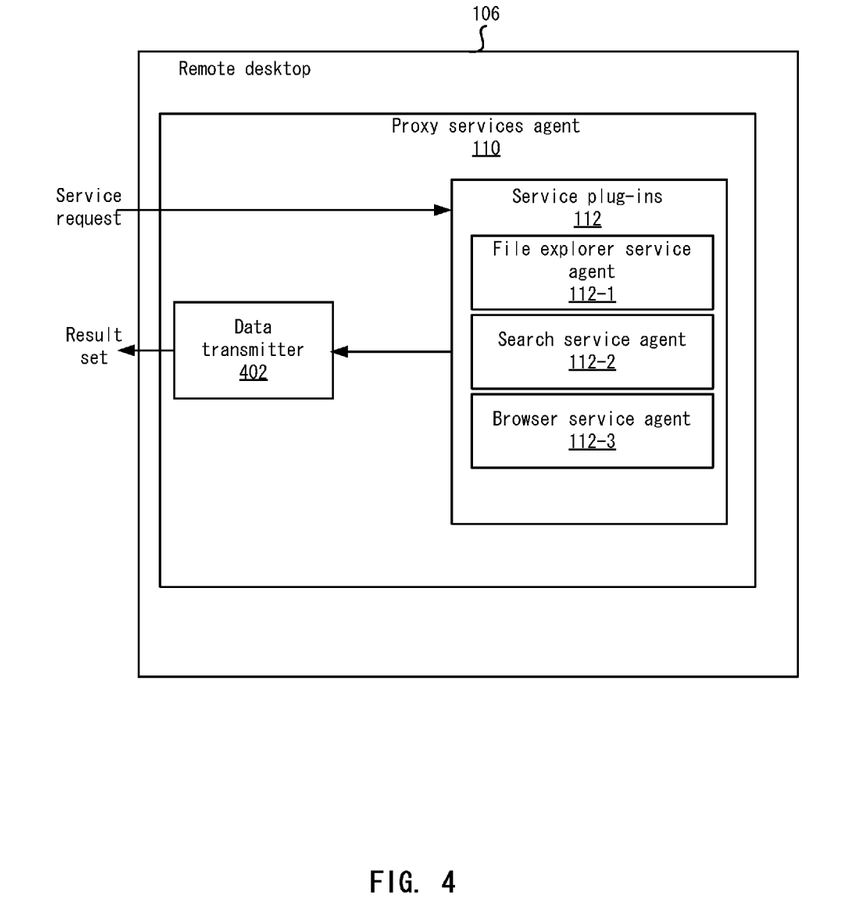
FIG. 4 depicts a more detailed example of a proxy services agent according to one embodiment.

Once client device 104 is authenticated, client device 104 can send service requests through tunnel 310. If the user on the same network as remote desktop 106, then communication may flow directly from client device 104 to remote desktop 106 without mediation through remote desktop gateway 302. In one example, client 104 may be provided an initial client services interface that provides various options to interact with remote desktop 106. For example, different services may be performed, such as the file explorer service, the search service, or the browser service. Client device 104 can generate and send a service request with the token through tunnel 310. Proxy services agent 110 verifies the token and can service the request. FIG. 4 depicts a more detailed example of proxy services agent 110 according to one embodiment. As described above, a service request may be received through a side channel from client device 104. Proxy services agent 110 responds to the service request and may maintain a record of all requests received from client device 104, which may be used in auditing of requests. For example, the audit trail is forwarded to desktop management server 102 for storage. In one embodiment, integration with industry accepted DLP (data leak prevention) products is provided. For example, every time a service request is handled audit logs are propagated to desktop management server 102. Because audit logs are kept, particular embodiments may comply with certain regulations that regulate the publishing of data. Additionally, a centralized copy of information (e.g., files) is kept in the data center. This may comply with company regulations. Also, edits made on client device 104 may be synchronized with the central copy.

Depending on the service request, proxy services agent 110 may leverage different service plug-ins 112. For example, a file explorer service agent 112-1, a search service agent 112-2, and a browser service agent 112-3 may be used to process different service requests. Other services may also be added as plug-ins and existing plug-ins may be removed. File explorer service agent 112-1 may perform requests associated with the files stored on or accessible to remote desktop 106. Search service agent 112-2 may perform searches of the local desktop at remote desktop 106. Browser service agent 112-3 may be a proxy for web browsing requests. For example, access to an intranet or the Internet is provided via browser service agent 112-3.

Proxy services agent 110 receives service requests and performs the requested services, optionally by performing system calls into the operating system running on remote desktop 106. For example, files may be retrieved by accessing system functions of the operating system on remote desktop 106. Also, applications running on remote desktop 106 may also be queried to perform the services. A result set gathered by proxy service agent 110 and then returned to client device 104. The type of result set may depend on the service performed. For example, proxy services agent 110 may use file explorer service agent 112-1 to output a list of files. Browser service agent 112-3 may output a web page and search service agent 112-2 may output search results of the local desktop. The service may be performed without invoking a corresponding application on remote desktop 106. For example, if a web page is opened, a web browser on remote desktop 106 will generally not be launched to open the web page. Rather, a query is performed to determine the requested web page via APIs of the operating system to access the web page. The result set may include HyperText Transfer Markup Language (HTML) for the web page.

Once the service has been performed by remote desktop 106, the result set is prepared for transmission to client device 104. A data transmitter 402 may optimize the result set based on the type of data being sent. For example, some data may be compressed and/or encrypted before sending. In one example, HTTP data from a web page may be compressed and files may be compressed and encrypted. The encryption may be secure socket layer (SSL) or other known encryption techniques. If the result set includes a file to send to client device 104, a hypertext transfer protocol (HTTP) chunked session is initiated and the file is divided into small binary chunks for transfer. Chunked transfer encoding is a data transfer scheme available in the HTTP WAN protocol and is leveraged to maintain a live connection to client device 104 to send variable sized chunks.

In a search example, search service agent 112-2 is used to performed searches of remote desktop 106 that might not be possible on client device 104. For example, a local email client on remote desktop 106 may be searched. The local email client may have access to an indexed version of the user's email on an email server. A user may enter a search query on client device 104 and the query is sent to proxy services agent 110. Search service agent 112-2 is used to perform the query. A result set is determined of emails that match the query based on a search of the indexed version of the user's email. Searching the indexed version is an efficient way to search through a user's email. The result set may then be sent back to client device 104. A native email application may then be used to display emails selected from the result set.

In a browser example, browser services agent 112-3 is used to perform web browsing of an internal enterprise intranet or the public Internet. Browsing of web pages may be more efficiently performed using remote desktop 106. For example, the bandwidth of a connection to the Internet in the data center may be faster than the bandwidth of a connection available to client device 104. In one example, a user may enter a uniform resource locater (URL) for a web page. The query is then sent to proxy services agent 110. Browser service agent 112-3 may access the web page using remote desktop 106. For example, the HTML of the web page is retrieved using APIs of the web browser on remote desktop 106. The web page is sent to client device 104, which launches a native web browser to display the web page. For example, the native web browser uses the HTML to display the web page. One way the browsing may be optimized is that the HTML for the web page may be compressed and sent to client device 104, which uses less bandwidth. Another way of optimization is link retrieval may be performed when the web page is retrieved. Link retrieval optimistically retrieves and caches web pages associated with the links on the web page sent to client device 104. Because bandwidth in the data center is usually faster, the web pages may be retrieved efficiently and stored at remote desktop 106. If a link is then selected by a user, then the newly selected page may be immediately sent to client device 104 without performing another web query.

Figure 5:
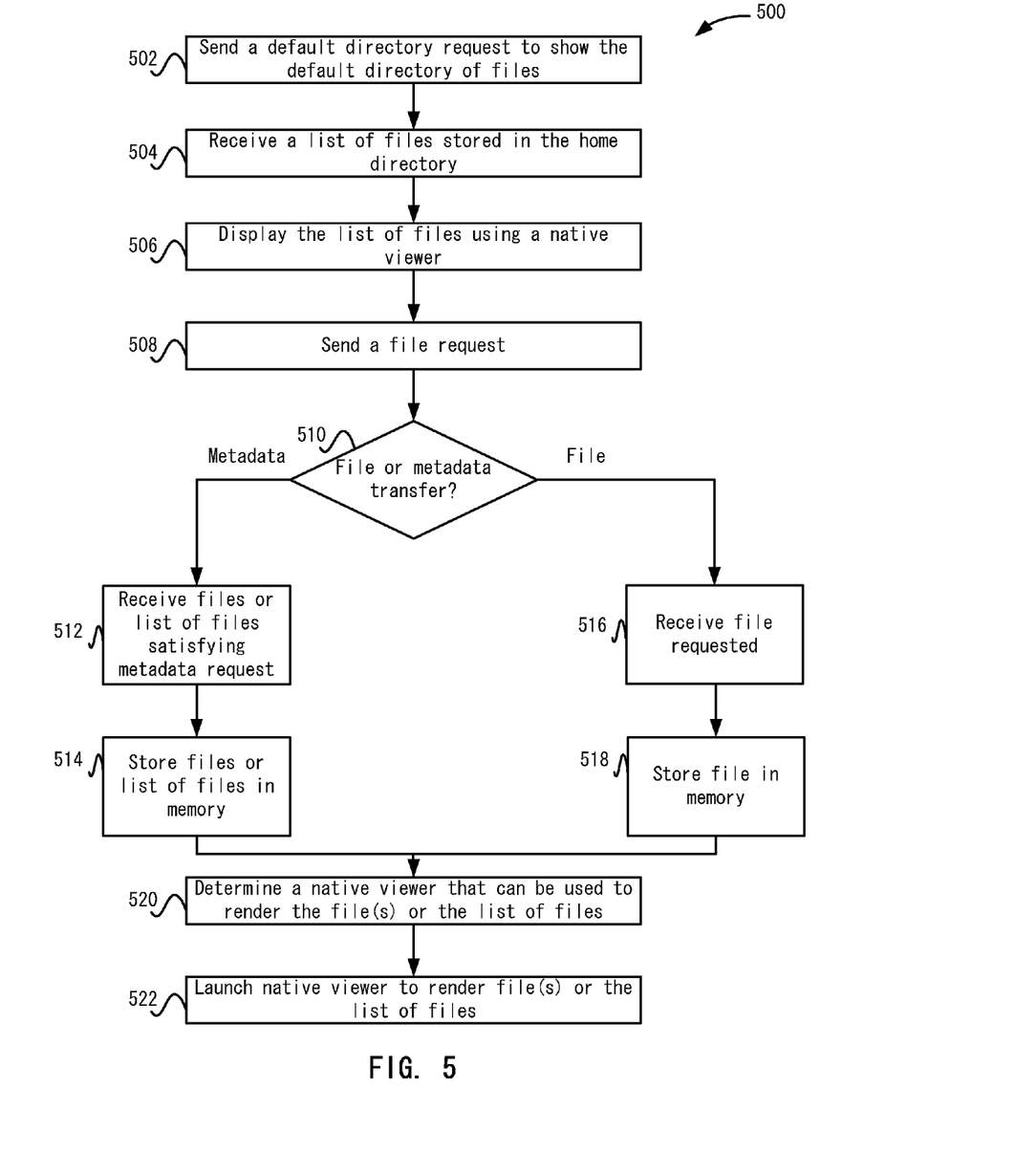
FIG. 5 depicts a simplified flowchart of a method for processing file service requests according to one embodiment.

In a file explorer example, a file system may be accessed using remote desktop 106. FIG. 5 depicts a simplified flowchart 500 of a method for processing file service requests according to one embodiment. In one example, a special handler/service is provided by file explorer service agent 112-1 to handle incoming file service requests. File explorer service agent 112-1 may be a micro HTTP protocol handler on a configurable port that provides HTTP file explorer remoting application programmer interfaces (APIs) for mobile devices. In one example, a connection is opened on a file handler port on client device 104 to have file service requests performed using the APIs.

At 502, client device 104 sends a default directory request to show the default directory (e.g., a home directory) of files. The default directory may also be configurable by each user or an administrator. At 504, client 104 receives a list of files stored in the home directory. For example, file explorer service agent 112-1 may send a request to remote desktop 106 to retrieve the list of files in the home directory. The "list of files" may include file names and/or folder names for files and folders in the directory. The list of files is returned as the result set to client 104.

At 506, client device 104 displays the list of files using native viewer 206. For example, the native file viewer application on client device 104 may be used to display the list of files. The user may then review the file list, navigate to other folders using additional directory requests, and perform a file request. At 508, client 104 generates and sends the file request. Different file requests may be sent, such as a metadata request or a file transfer request. File transfer requests are requests for file contents and metadata requests return information describing data about files that are stored at remote desktop 106. Examples of metadata requests include requests such as "GetAllFiles" for a default folder (e.g., a "My Documents" folder in Windows), which retrieves a list of files stored in the folder. Additional requests may also be supported, such as "recentlyUsedFiles", "searchFilesInAFolder", and "emailFiles". These requests retrieve recently used files, search for files in a folder, or email certain files.

At 510, it is determined whether the request is for a file transfer or a metadata transfer. If the request is a metadata request, at 512, client device 104 receives requested file information or list of files. At 514, the file information or list of files is stored in memory 204. If the request is a file transfer request, at 516, client 104 receives at least a portion of the contents of the file or files requested. For example, the file contents may be sent in chunks or pages. At 518, the file contents are stored in memory 204. The result set for either type of request may also contain metadata information about the files retrieved, such as "isFileAFolder", "lastModified Timestamp", "fileSize", and "fileACL" metadata. The "isFileAFolder" metadata indicates whether the file is a folder, the "lastModified Timestamp" metadata indicates the time when the file was last modified, the "fileSize" metadata indicates the size of the file, and the "fileACL" metadata indicates the access rights to the file.

Figure 6A:
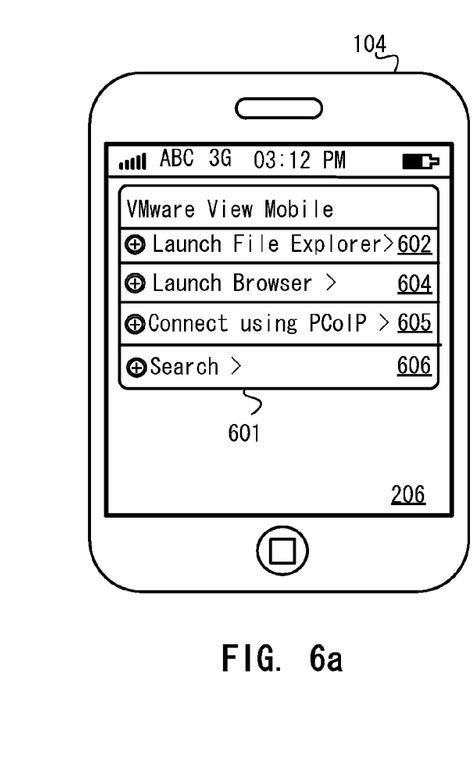
FIG. 6a shows a first view of a native file explorer application for file viewing according to one embodiment.

Whether the request was a metadata request or a file transfer request, at 520, native viewer selector 208 determines a native viewer 206 that can be used to render the requested information pertaining to the file(s) or list of files or contents. At 522, native viewer launcher 210 launches native viewer 206 to render the file(s) or list of files. FIG. 6a shows a first view 601 of a native file explorer application for file viewing according to one embodiment. A native file explorer application may be used to display the list of file names. In a first view 601, an initial client services interface is shown. View 601 includes a "Launch File Explorer" option 602, a "Launch Browser" option 604, a "Connect using PCoIP" option 605, and a "Search" option 606. Launch file explorer option 602 allows a user to perform file service requests. Launch browser option 604 allows a user to perform browser retrieval of web content. Connect using PCoIP option 605 allows the user to connect to a standard remote desktop protocol session. This is where a bitmap of the user's remote desktop 106 is displayed at client 104. Search option 606 allows local searches of remote desktop 106.

Figure 6B:
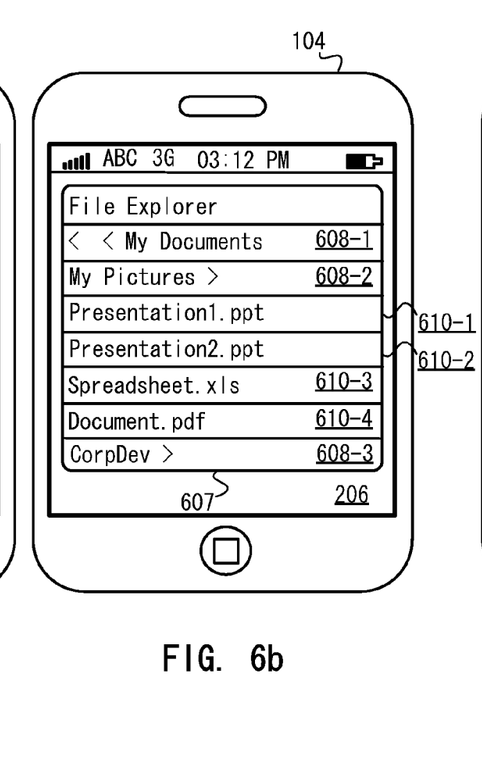
FIG. 6b shows a second view of a native file explorer application for file viewing according to one embodiment.

FIG. 6b shows a second view 607 of a native file explorer application for file viewing according to one embodiment. In second view 607, Launch File Explorer option 602 has been selected and a new view is displayed. Second view 607 may be generated as a native view so the experience is similar to accessing a local file system on client device 104. That is, native viewer 206 is the same viewer that is used to access files that are stored locally on client device 104. View 607 may display a default directory (or another directory that is requested by the user). In this case, client device 104 generates a service request to remote desktop 106 for the default directory. File explorer service agent 112-3 services the request and returns metadata with a list of folders and/or files in the directory. For example, the default directory includes folders 608-1-608-3 of "MyDocuments", "MyPictures", and "CorpDev". Additionally, files 610-1-610-4 are of different types (e.g., .ppt, .xls, and .pdf).

When a file or folder is selected by the user, e.g., by tapping it, the file may be downloaded to memory 204 and native viewer 206 may be launched to render the file contents or list of files. In one example of a metadata request, the "MyPictures" folder 608-2 may be selected. A metadata request for the list of files in the "MyPictures" folder 608-2 may then be generated and sent to remote desktop 106. File explorer service agent 112-1 then processes the request to determine the list of files in the "MyPictures" folder on the user's remote desktop 106. The list of files is sent to client device 104 and rendered in native viewer 206. For example, the list is shown using the local file explorer application, which leverages the form factor of client device 104. Also, in an example of a file transfer request, a selection from user is received for one of files 610, such as the "GartnerHype.pdf" file 610-4. The request for the file is generated and sent to remote desktop 106. File explorer service agent 112-1 processes the request to have remote desktop 106 retrieve the file. The file is processed by data transmitter 402 for optimal transmission and then sent to client device 104. Client device 104 receives the content and result set receiver 202 performs any pre-processing of data such as decryption/decompression. Client device 104 then determines that the type of the file is a PDF file and invokes the native PDF viewer. The native PDF viewer then displays the "Document.pdf" file 610-4. In one example, the native PDF viewer may be a different application (e.g., from a different vendor) than the PDF viewer on remote desktop 106. There may be no restriction as to the application used to view the result set on client device 104.

Figure 6C:
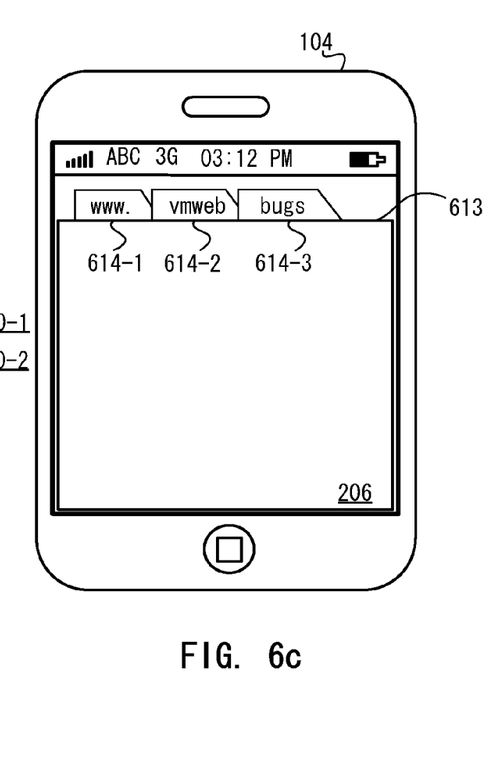
FIG. 6c shows a third view of a native web browsing application for web content viewing according to one embodiment.

FIG. 6c shows a third view 613 of a native web browsing application for web content viewing according to one embodiment. For example, the Internet or private enterprise intranet sites may be accessed using browser service agent 112-3. Tabs 614-1, 614-2, 614-3 are standard browser tabs that allow the user to switch between multiple open browser windows. Using a tab 614-1, for example, an Internet web browser may be selected to perform searches. Tab 614-2, may show a private enterprise intranet web page and tab 614-3 may show yet another private intranet web page, e.g., a bug listing. In one example, tab 614-2 may be selected and a native web browser may be displayed. A search query is received from the user and a search request is sent to remote desktop 106. Browser service agent 112-3 proxies the request to remote desktop 106 to have the search request performed. For example, a webpage may be retrieved from the intranet. When the webpage is sent to client device 104, the web page can be optimized for enhanced transmission by data transmitter 402 and rendered by the native web browser.

Accordingly, particular embodiments use native viewer 206 to display result sets from service requests. Using native viewer 206 leverages the form factor and ergonomics of client device 104. For example, if client device 104 has a small mobile phone form factor, a complete Windows™ desktop folder view may not be intuitive for the user. Additionally, converting touch events to mouse/keyboard events may not work correctly on mobile phones with small screen resolutions. Using native viewer 206 allows those touch events to be used without translation to mouse/keyboard events. Additionally, the features of native viewers 206 may now be leveraged. For example, features such as zoom in, pan, and rotate on locally-rendered native viewers 206 for different file formats may be leveraged.

While file viewing has been described, file editing is also possible where the changes may be pushed back to remote desktop 106. In this case, changes may be sent back to remote desktop 106. The edits may be stored in the files at remote desktop 106. Different techniques may be used to store the changes, such as a binary "cliff" of files to push back only changes in a file.

Figure 7:
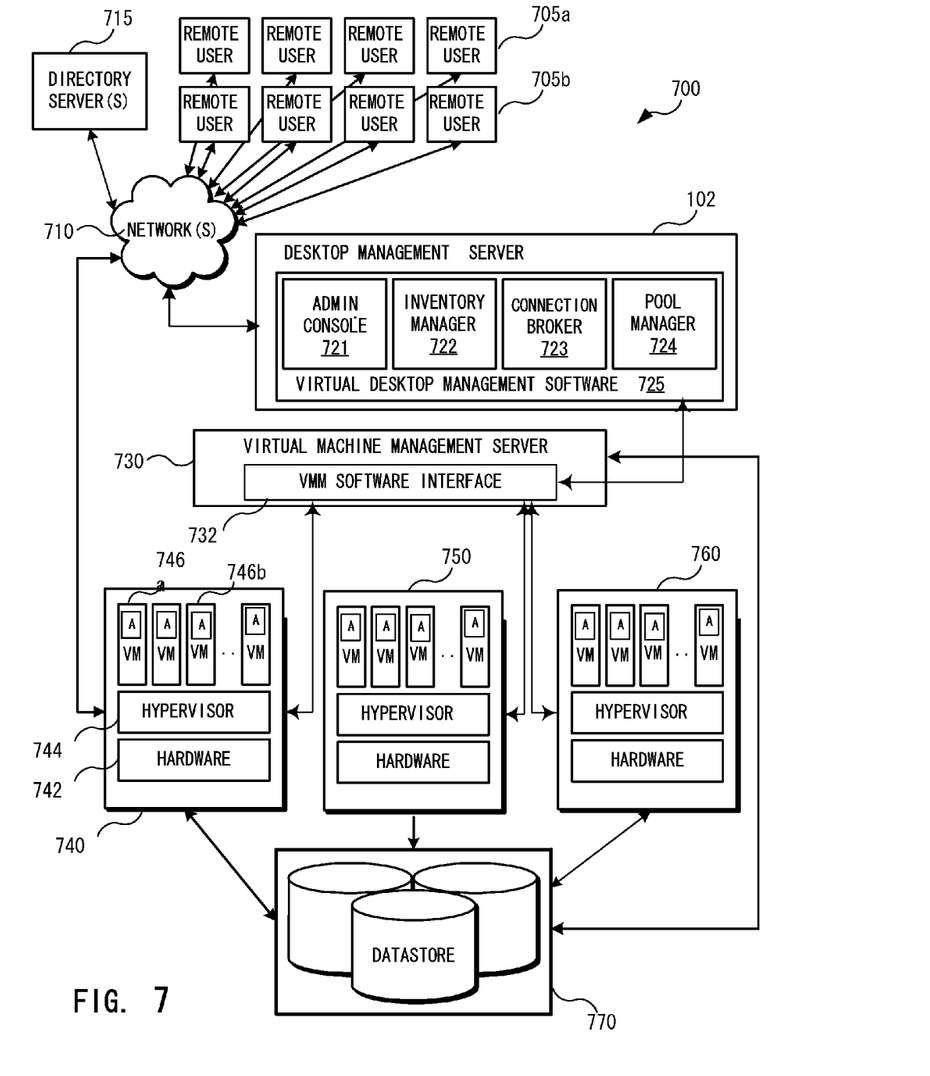
FIG. 7 is a block diagram of an example general virtualized machine architecture environment for executing example embodiments.

FIG. 7 is a block diagram of an example general virtual desktop infrastructure (VDI) environment for executing example embodiments. The following architecture may be used in a remote desktop session and may be enhanced to use the client services interface to have services performed and return result sets for display using native viewers 206. As shown in FIG. 7, in traditional use, remote users, for example users 705a and 705b, may access centrally-managed remote desktops 106, such as those implemented by virtual machines 746 running in a datacenter, using network 710 (e.g., a local area network, or other private or publically accessible wide area network, such as the Internet) through any number of different types of devices. These virtual machines (VMs) 746 are complete computation environments, containing virtual equivalents of the hardware and system software components of a physical system as described above, and are typically implemented by an extensive virtualization infrastructure, which includes a variety of software and hardware components.

Remote access to remote desktops is generally provided to client devices through a desktop management server 102. Desktop management server 102 provides access to remote desktops by the remote user devices, and manages the corresponding virtual machines through communications with a software interface 732 of a Virtual Machine Management Server (VMMS) 730. The Virtual Machine Management Server (VMMS) 730 is responsible for provisioning and maintaining the multitude of Virtual Machines (VMs) 746 implemented across potentially a multitude of physical computers, such as computers 740, 750, and 760. When a user wishes to access an existing virtual machine, the user establishes a connection through the desktop management server 102, and a remote desktop is presented (as a user interface) on the user's client device, through which communications are made with the underlying virtual machine. Additionally, the virtual machine may include a proxy services agent 110 as described above with reference to FIGS. 1 and 4 to perform service requests.

In the example embodiment shown, each physical computer, for example computer 740 contains the underlying hardware 742, virtualization software (here a hypervisor 744), and one or more virtual machines, for example VM 746a and VM 746b, which each contain Agent Software (guest system software) labeled here as "A" in each VM box. The Agent Software is typically responsible for connecting each VM to the desktop management server 102 and manages each desktop connection. It typically notifies the desktop management server 102 upon each login, logoff, and disconnect. The Agent Software also provides support for remote devices such as USB devices, etc. The Agent Software may also be enhanced to include proxy services agent 110 and service plug-ins 112.

The VMMS 730 typically manages pools of compute resources used to run virtual machines on a set of clusters typically containing multiple servers with CPUs, memory, and communications hardware (network). A virtual computer (a virtual machine or VM), when active, consumes physical compute resources and is managed by a hypervisor layer, such as hypervisor 744 running on physical computer 740. The hypervisor manages physical resources as well as maintains virtual-to-physical hardware mappings. The Software Interface 732 running on the VMMS 730 communicates with these hypervisors (e.g., hypervisor 744) to provision and manage each VM 746. For example, according to traditional virtualization techniques, when a remote user (e.g., user 705a) requests access to a particular existing desktop, the desktop management server 102 (through its software 725), communicates with the VMMS through its software interface 732 to start the corresponding VM 746 executing on an appropriate physical computer, and to relay the user interface exported by the VM 746 to the remote user so that the user can interact with the remote desktop. In some instances (e.g., according to administrator policies), when the desktop is exited, or otherwise shutdown, the desktop management server 102 communicates with the VMMS 730 to save the VM image to the datastore 770 as appropriate and to de-allocate physical and VM system resources as needed.

In general, the VMMS Server 730 provides interfaces 732 to enable other programs, such as the Pool Manager 724, to control the lifecycle of the various virtual machines that run on a hypervisor. In one example embodiment of an existing virtualization infrastructure provided by VMware Inc., desktop management server 102 includes an Administrative Console 721, an Inventory Manager 722, a Connection Broker 723, and a Pool Manager 724. The Connection Broker 723 allows a remote user, such as remote user 705a, through client device 104, to initiate a desktop session with an assigned VM 746 or to access an existing connection to VM 746. Connection Broker 723 may also be enhanced to include remote desktop gateway 302.

The Inventory Manager 722 maintains a mapping of different user belongings in the system. For example, user may be entitled to certain applications; may have access to more than one desktop, etc. The Inventory Manager 722 also keeps track of the running remote desktops in the system. The mappings may be stored using any number of mechanisms, including using one or more directory servers 715 accessible through network 710.

The Pool Manager 724 component manages the complete lifecycle of remote desktops. Desktops in a pool are grouped together based on similar software requirements. Desktop Administrators create logical desktops groups (desktop pools) that are provisioned typically from the same base image, including the Agent Software. For example, a desktop pool may include virtual machines that run the same set of software applications and run the same operating system. As yet another example, a desktop pool may contain a set of cloned virtual machines that are identical in every aspect but are customized to include unique identity that includes for example, a unique computer name, IP/MAC Address, Domain membership, Software license serial numbers, OS specific security identifiers among other things. The base image can be a virtual machine or a template virtual machine that is created and/or managed by the VMMS 730.

The software state of all the virtual machines 746 in a desktop pool may be persistent or non-persistent. Persistent desktops maintain the state of the files or applications stored inside the virtual machines. Non-Persistent desktops are stateless desktops; the desktop state is restored to the original state after every user session. In some cases, the Desktop Administrator can define how frequently the "revert to golden state" operation should be performed. The restore to pristine image or revert to golden state operation can also be scheduled to occur based on certain conditions.

The Administrative Console 721 typically provides a user interface for a Desktop Administrator to manage the configuration of desktop pools, define user access policies, manage ongoing maintenance, software installed in the desktops, etc.

The Directory Server 715 stores the persistent state required for managing the remote desktops. For example, the VMs in a desktop pool maybe associated with one or more users. The user identifiers for a pool may be stored in the directory server 715. The users may also be referenced through an external directory server such as—Microsoft Active Directory, Novell eDirectory, IBM Tivoli Directory Server, etc.

Examples and details of variants of virtualization architectures, such as that described with reference to FIG. 7, can be found in U.S. patent application Ser. No. 12/694,358, filed Jan. 27, 2010 and entitled, "Independent Access to Virtual Machine Desktop Content;" U.S. patent application Ser. No. 12/694,368, filed Jan. 27, 2010 and entitled, "Accessing Virtual Disk Content of a Virtual Machine Using a Control Virtual Machine;" U.S. patent application Ser. No. 12/694,383, filed Jan. 27, 2010 and entitled, "Accessing Virtual Disk Content of a Virtual Machine Without Running A Virtual Desktop;" U.S. patent application Ser. No. 11/395,012, entitled Virtualized Desktop Allocation System Using Virtual Infrastructure, filed Mar. 31, 2006; U.S. patent application Ser. No. 12/058,269, entitled Synchronized Clones, filed Mar. 28, 2008; and in U.S. Patent Publication No. 2009/0216975, entitled Extending Server-Based Desktop Virtual Machine Architecture to Client Machines, filed Feb. 23, 2009, all of which are incorporated by reference in their entireties for all purposes.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. The various embodiments described herein may also be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable storage media. The term computer readable storage medium refers to any data storage device that can store data which can thereafter be input to a computer system—computer readable media may be based on any existing or subsequently developed technology for embodying computer programs in a manner that enables them to be read by a computer. Examples of a non-transitory computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, various virtualization operations may be wholly or partially implemented in hardware.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents may be employed without departing from the scope of the invention as defined by the claims.

What is claimed is:

1. A method comprising:
   establishing a session between a client device and a remote desktop to enable the client device to remotely access the remote desktop;
   sending, from the client device, a request for a service to be performed by the remote desktop in the session;
   receiving a result set determined from the service being performed by the remote desktop;
   based on a type of data included in the result set, determining, from a plurality of native viewers on the client device, if the client device includes a native viewer enabled to render the result set for the client device; and
   if the client device includes a native viewer that is enabled to render the result set for the client device, invoking the native viewer to render the result set for the client device; or
   if the client device does not include a native viewer to render the result set:
      communicating with a third party application to have the result set displayed by the third party application running on a remote server; and
      displaying, on the client device, a remote desktop representation of the third party application.

2. The method of claim 1, wherein the client device has an associated form factor that is different than the remote desktop, wherein the native viewer presents the result set in a manner tailored to the form factor of the client device.

3. The method of claim 1, wherein:
   the result set comprises metadata; and
   the metadata is used to determine which third party application to use.

4. The method of claim 1, further comprising, prior to transmitting the result set to the client device, optimizing the result set for transmission by the remote desktop based on the type of data in the result set.

5. The method of claim 1, wherein the service comprises a search service for searching the remote desktop, a browser service for performing a browser-based search, or a file explorer service for accessing a file system, thereby allowing the client device to display the results of a search or the results of accessing a file system without display of the user interface of the remote desktop.

6. The method of claim 1, wherein the service request comprises a request for a list of files and the result set comprises the list of files, wherein invoking the third party application comprises:
   invoking a file explorer to display the list of files in a form factor associated with the client device.

7. The method of claim 1, wherein the service request comprises a request for a file and the result set comprises content for the file, wherein invoking the third party application comprises:
   invoking a file viewer to generate an image comprising the content of the file.

8. The method of claim 7, further comprising storing the content at the client device, wherein additional requests for the file are serviced from the stored content rather than the remote desktop.

9. The method of claim 8, wherein the additional requests are serviced from the stored content after the session between the client device and the remote desktop has ended.

10. The method of claim 7, further comprising:
    receiving a first portion of the content for the file, wherein the first portion is displayed using the third party application; and
    upon a further request, receiving a second portion of the content for the file, wherein the second portion is displayed using a second third party application.

11. The method of claim 1, wherein the service request is sent and the result set is received through a side channel configured to send and receive non-display traffic.

12. The method of claim 1, further comprising:
    performing authentication of the client device with a desktop management server; and
    sending the request and receiving the result set through a tunnel created upon authentication through the desktop management server.

13. A non-transitory computer-readable storage medium containing instructions for controlling a computer system to be operable to:
- establish a session between a remote desktop and a client device to enable the client device to remotely access the remote desktop;
- send, from the client device, a request for a service to be performed by the remote desktop;
- receive a result set determined from the service being performed by the remote desktop;
- based on a type of data included in the result set, determine, from a plurality of native viewers on the client device, if the client device includes a native viewer enabled to render the result set for the client device; and
- if the client device includes a native viewer that is enabled to render the result set for the client device, invoking the native viewer to render the result set for the client device; or
- if the client device does not include a native viewer to render the result set:
  - communicating with a third party application to have the result set displayed by the third party application running on a remote server; and
  - displaying, on the client device, a remote desktop representation of the third party application.

14. The non-transitory computer-readable storage medium of claim 13, wherein the result set is displayed without displaying an image of the user interface of the remote desktop or of an application running on the remote desktop.

15. The non-transitory computer-readable storage medium of claim 13, wherein the result set is displayed without using a remote desktop protocol.

16. The non-transitory computer-readable storage medium of claim 13, wherein the result set is received by the client device after the service is performed by the remote desktop.

17. The non-transitory computer-readable storage medium of claim 13, wherein the session is not a remote desktop protocol session.

18. A system comprising:
- a remote desktop;
- a client device comprising a plurality of native viewers; and
- a processor programmed to:
  - establish a session between the client device and the remote desktop;
  - send, from the client device, a request for a service to be performed by the remote desktop;
  - receive, from the remote desktop, a result set from the service being performed by the remote desktop;
  - based on a type of data included in the result set, determine, from a plurality of native viewers on the client device, if the client device includes a native viewer enabled to render the result set for the client device; and
  - if the client device includes a native viewer that is enabled to render the result set for the client device, invoking the native viewer to render the result set for the client device; or
  - if the client device does not include a native viewer to render the result set:
    - communicating with a third party application to have the result set displayed by the third party application running on a remote server; and
    - displaying, on the client device, a remote desktop representation of the third party application.

* * * * *